United States Patent [19]

Rauch

[11] Patent Number: 4,530,674
[45] Date of Patent: Jul. 23, 1985

[54] COUPLING ARRANGEMENT FOR DRIVING AND DRIVEN MEMBERS

[75] Inventor: Burton S. Rauch, Howell, N.J.

[73] Assignee: Allied Corporation, Morris Township, N.Y.

[21] Appl. No.: 538,031

[22] Filed: Sep. 30, 1983

[51] Int. Cl.³ .......................... F16D 3/10; F16D 3/50
[52] U.S. Cl. ........................................ 464/75; 464/89;
      464/147; 464/150; 464/155; 464/156; 464/158
[58] Field of Search ........................ 464/73–75,
      464/87, 89, 147, 155, 156, 149–151, 158;
      403/365, 383

[56] References Cited

U.S. PATENT DOCUMENTS

| | | | |
|---|---|---|---|
| 1,906,057 | 4/1933 | Guy | 464/89 |
| 2,004,712 | 6/1935 | Thiry | 464/87 X |
| 2,639,496 | 5/1953 | Hartzell | 464/75 X |
| 3,321,935 | 5/1967 | Wildhaber | 464/75 |
| 3,826,108 | 7/1974 | Bradel, Jr. et al. | 464/156 |
| 4,047,395 | 9/1977 | Bendall | 464/75 X |
| 4,132,090 | 1/1979 | McDermott | 464/156 |
| 4,162,619 | 7/1979 | Nixon, Jr. | 464/75 X |
| 4,357,137 | 11/1982 | Brown | 464/75 |
| 4,373,925 | 2/1983 | Fickelscher | 464/74 |

FOREIGN PATENT DOCUMENTS

| | | | |
|---|---|---|---|
| 801721 | 1/1951 | Fed. Rep. of Germany | 464/155 |
| 1010911 | 6/1952 | France | 464/89 |
| 517396 | 6/1957 | Italy | 464/89 |
| 538096 | 7/1941 | United Kingdom | 464/75 |
| 538625 | 8/1941 | United Kingdom | 464/75 |
| 564215 | 9/1944 | United Kingdom | 464/75 |
| 2076114 | 11/1981 | United Kingdom | 464/75 |

*Primary Examiner*—John Petrakes
*Attorney, Agent, or Firm*—Howard G. Massung; Stanley N. Protigal

[57] ABSTRACT

A coupling shaft couples driving and driven shafts which are subject to relative misalignment. The coupling shaft has crowned male polygonal profiles on both of its ends, and which ends mate directly with corresponding female polygonal profiles carried by the driving and driven shafts. The crowned male profiles permit the coupling arrangement to act in a hinge like manner to accommodate the misalignment. Non-metallic bushings and adapters may be interposed between the coupling shaft and the driving and driven shafts to eliminate metal to metal contact and to thereby eliminate fretting and metal wear which would otherwise occur.

7 Claims, 8 Drawing Figures

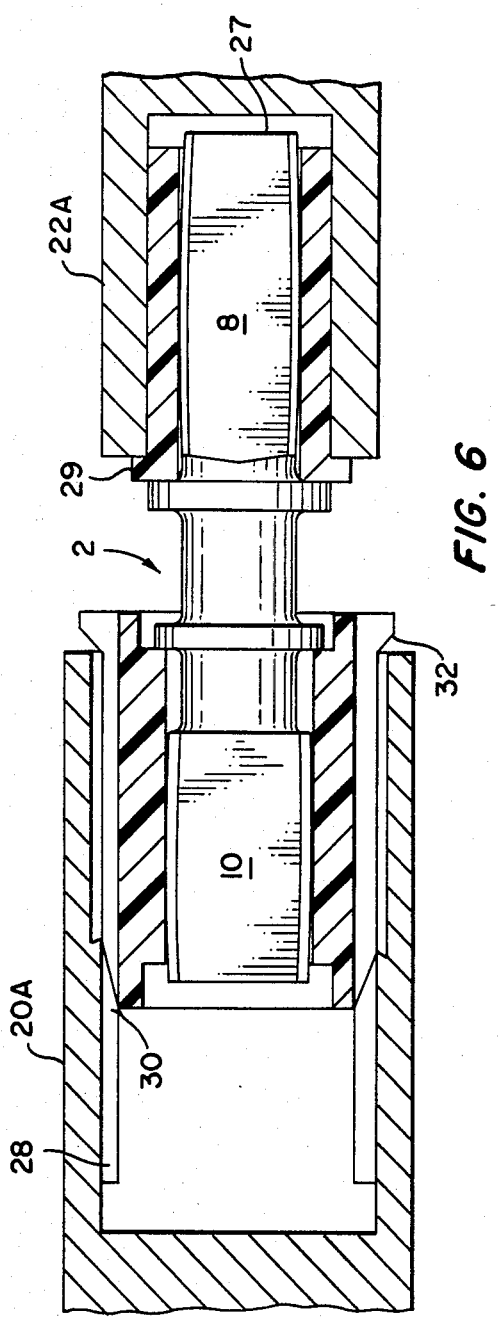
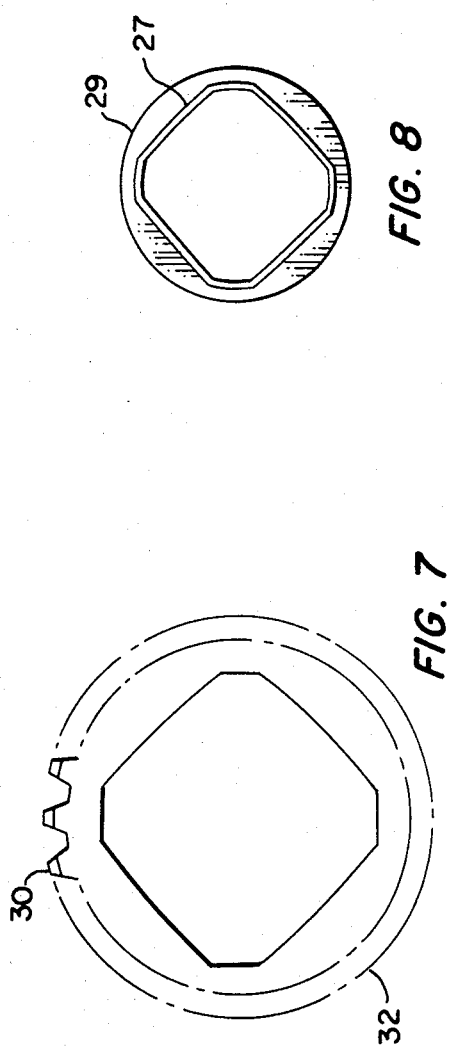

COUPLING ARRANGEMENT FOR DRIVING AND DRIVEN MEMBERS

BACKGROUND OF THE INVENTION

Driving and driven members such as a metallic driving shaft and a metallic driven shaft must be coupled to transmit required torques from the driving to the driven shaft. The coupling arrangement must take into account that misalignment between the driving and driven shafts frequently occurs. This misalignment must be accommodated without high stress concentration. Further, depending on the degree of misalignment, the coupling arrangement must function so that excessive wear caused by fretting when the two metallic shafts are subjected to relative motion does not occur.

The invention described and claimed in commonly assigned copending U.S. application Ser. No. 394,241, filed July 1, 1982, by the present inventor and now abandoned accommodates driving/driven shaft misalignment by providing a non-metallic adapter through which the metallic driving shaft and the metallic driven shaft are directly coupled one to the other. While this arrangement has been found satisfactory for some conditions of misalignment, it has been found that other conditions of misalignment are best accommodated by providing an independent member which couples the driving and driven shafts. Moreover, the adapter described in the aforenoted U.S. application Ser. No. 394,241 is space consuming and hence not desirable for some applications. Additionally, the present arrangement which features an independent coupling member, as will be hereinafter described, accommodates driving/driven shaft misalignment more effectively than has heretofore been possible. Accordingly, the present invention is an improvement over that described in the aforenoted U.S. application Ser. No. 394,241.

SUMMARY OF THE INVENTION

This shaft contemplates a coupling arrangement for driving and driven shafts, whereby a metallic coupling shaft couples a metallic driven shaft to a metallic driving shaft. The ends of the coupling shaft have longitudinally extending, harmonically varying male polygonal profiles which mate with corresponding longitudinally extending, harmonically varying female polygonal profiles carried by the driving and driven shafts. The male profiles are crowned along their length to permit the mating male and female profiles to act in a hinge like manner, whereby misalignment between the driving and driven shafts is accommodated. A non-metallic bushing may be interposed between the male and female profiles. The non-metallic bushing has sufficient compliance to accept relatively high misalignments between said shafts without excessive wear thereof as might otherwise occur. A non-metallic adapter may be interposed between the male and female profiles, and which adapter also has sufficient compliance to accept relatively high misalignment between the driving and driven shafts without excessive wear thereof.

BRIEF DESCRIPTION OF THE DRAWING

FIG. 6 is a diagrammatic plan view showing the coupling shaft in engagement with one of the driving and driven shafts through a bushing and in engagement with the other of said shafts through an adapter.

FIG. 7 is an end view showing a harmonically varying female polygonal configuration of the adapter shown in FIG. 6.

FIG. 8 is a diagrammatic end view showing a harmonically varying female polygonal configuration of the bushing shown in FIG. 6.

DETAILED DESCRIPTION OF THE INVENTION

Figure 1:
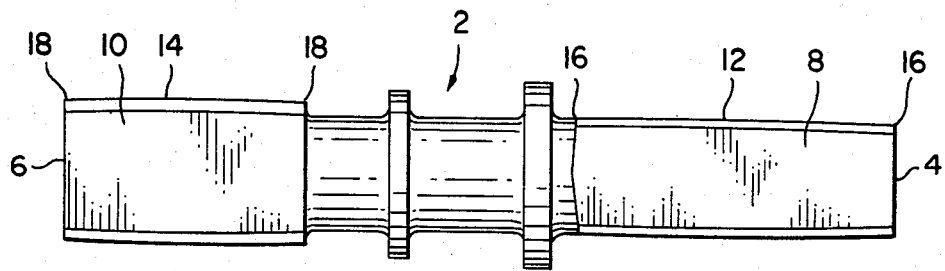
FIG. 1 is a diagrammatic plan view representation showing a coupling shaft in accordance with the invention.

With reference first to FIG. 1, a metallic coupling shaft is designated generally by the numeral 2 and has ends 4 and 6. Ends 4 and 6 have harmonically varying longitudinally extending male profiles 8 and 10, respectively.

Figure 2:
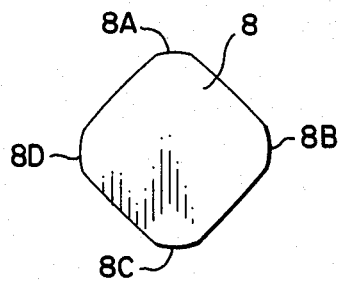
FIG. 2 is a diagrammatic end view showing a harmonically varying male polygonal profile configuration of one of the ends of the coupling shaft shown in FIG. 1, with the other of the ends having the same configuration.
Figure 3:
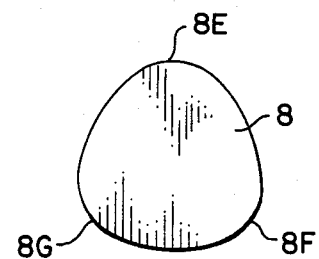
FIG. 3 is a diagrammatic end view showing an alternative harmonically varying male polygonal profile configuration which may be used for the purposes of the invention.

Profiles 8 and 10 may be of the four lobe or three lobe configuration as shown in FIGS. 2 and 3, respectively, wherein profile 8 is shown for purposes of example. In FIG. 2 profile 8 has lobes 8A, 8B, 8C and 8D, and in FIG. 3 the profile has lobes 8E, 8F and 8G. The geometry of three or four lobe polygonal profiles 8 and 10 is described in substantial detail in the aforenoted copending U.S. application Ser. No. 394,421, and which description is incorporated herein by reference. Although, for purposes of example, the present invention will be described with reference to the four lobe configuration, it will be understood that the three lobe configuration will serve the purpose of the invention as well.

With continued reference to FIG. 1, it will be seen that male profiles 8 and 10 are longitudinally crowned. That is to say, the centers 12 and 14 of profiles 8 and 10, respectively, are of a larger diameter than the end portions 16 and 18 thereof, so as to impart a barrel like shape to the profiles. The purposes of the aforenoted crowning will be hereinafter described.

Figure 5:
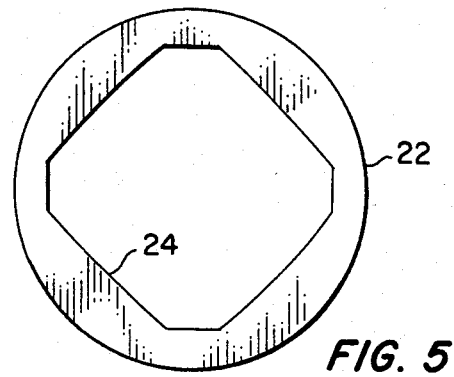
FIG. 5 is a diagrammatic end view showing the harmonically varying female polygonal configuration of at least one of the driving and driven shafts.
Figure 4:
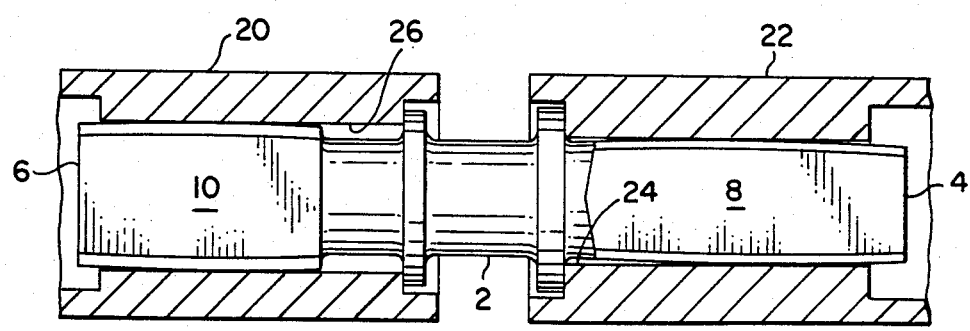
FIG. 4 is a diagrammatic plan view showing a coupling shaft in direct engagement with the driving and driven shafts according to one embodiment of the invention.

With reference to FIG. 4, a metallic driving shaft is designated by the numeral 20 and a metallic driven shaft is designated by the numeral 22. Shafts 20 and 22 have harmonically varying longitudinally extending female polygonal profiles 24 and 26, respectively, and which female profiles correspond to male profiles 8 and 10 of coupling shaft 2 (FIG. 2). Shaft 22 and its corresponding female profile 24 are shown in the end view representation of FIG. 5.

Thus, male profile 8 slidingly engages female profile 24 and male profile 10 slidingly engages female profile 26, whereby driving shaft 20 and driven shaft 22 are coupled via coupling shaft 2.

With reference to the aforenoted crowning of male profiles 8 and 10, i.e. crowns 12 and 14, respectively, it will be understood that the purpose of said crowning is to permit shafts 20 and 22 to function is a misaligned condition without excessive wear when the male profiles engage the female profiles for coupling the shafts. To put it another way, the purpose of the aforenoted crowning is to prevent concentrated loading at the ends of the male profile and to thereby eliminate the aforenoted excessive wear under conditions of misalignment as is likely to occur. That is to say, the crowning of the male profiles permits the engaged male and female profiles to act in a hinge like manner to effectively accommodate misalignment between driving shaft 20 and driven shaft 22.

The arrangement shown in FIG. 4 involves metal-to-metal contact, which in an unlubricated drive system such as is here being described, fretting and metal wear is likely to occur under conditions of realtively high misalignment under any circumstances. This, of course, results in damage to the metallic components, the replacement of which is costly and time consuming. The configuration of the invention shown in FIG. 6 accommodates driving and driven shaft misalignment without the aforenoted fretting, metal wear and associated contact stresses.

With specific reference to FIG. 6, a driven shaft designated as 22A is adapted to accommodate a non-metallic bushing 27. Bushing 27 has longitudinally extending, harmonically varying male and female polygonal profiles such as shown in the end view of FIG. 8. The male profile corresponds to the female profile of driven shaft 22A and the female profile corresponds to the male profile of coupling shaft 2, and which male profile is received in sliding fit relationship by the female profile of bushing 27. Shoulder 29 of bushing 27 acts as a stop. Bushing 27 thus becomes the wear element of the coupling arrangement.

A driving shaft designated as 20A has an internal spline 28 which engages in mating relationship, an external spline 30 carried by an adapter 32 as shown in FIG. 7 to prevent rotation between the drive shaft and the adapter. Adapter 32 has a longitudinally extending, harmonically varying female polygonal profile corresponding to the male polygonal profile of coupling shaft 2, and which female polygonal profile receives the male polygonal profile. In this instance adapter 32 is the wear element of the coupling arrangement.

In the embodiment of the invention shown in FIG. 6, bushing 26 and adapter 32 are of a polyimide material, such as that marketed under the trade designation Vespel SP-1 by the Dupont Corporation or that marketed under the trade designation Torlon 4203 by the Amoco Corporation. This material has sufficient compliance to accept relatively high misalignments between shafts 20A and 22A without high stress concentration. Further, the interposition of bushing 27 and adapter 32 in conjunction with the crowning of profiles 8 and 10 of shaft coupling 2 eliminates the aforenoted fretting and associated wear as will occur when two otherwise contacting metal parts are subject to relative motion.

In the embodiment of the invention shown in FIG. 6, one end of shaft coupling 2 is coupled to driven shaft 22A via bushing 27 and the other end of the coupling shaft is coupled to driving shaft 20A via adapter 32. It will be understood that either the bushing or the adapter may be used in conjunction with both ends of the coupling shaft or with only one end of the shaft as the case may be, depending on the degree of misalignment anticipated and the resulting stress concentration to be accommodated.

There has thus been described means for coupling a driving shaft to a driven shaft, which accommodates any inherent misalignment between the shafts. The misalignment is accommodated by virtue of crowned male polygonal profiles on both ends of a coupling shaft, and which profiles mate with corresponding female profiles either directly or through non-metallic, relatively compliant bushings or adapters. With the aforenoted description in mind, reference is to be had to the appended claims which define the scope of the invention.

What is claimed is:

1. A coupling arrangement for coupling metallic driving and driven shafts, characterized by:

the driving and driven shafts each having ends with longitudinally extending, harmonically varying female polygonal profiles;

a metallic coupling shaft, the ends of which each have longitudinally extending, harmonically varying male polygonal profiles corresponding to the female profiles of the ends of the driving and driven shafts;

the male profiles being crowned along their lengths; and the crowned male profiles of the coupling shaft being received in sliding fit relationship by the corresponding female profiles of the driving and driven shafts for coupling said shafts, whereby the mating male and female profiles act in a hinge-like manner to accommodate misalignment between the coupled driving and driven shafts.

2. A coupling arrangement as described by claim 1, further characterized by:

a non-metallic relatively compliant bushing having a longitudinally extending, harmonically varying male polygonal profile and a longitudinally extending, harmonically varying female polygonal profile corresponding respectively to the female profile of at least one of the driviing and driven shafts and to the male profile of at least one of the ends of the coupling shaft;

the male profile of the bushing being received in press fit relationship by the female profile of the one of the driving and driven shafts, and the female profile of the bushing receiving in sliding fit relationship the male profile of the one end of the coupling shaft; and the relative compliance of the non-metallic bushing being effective to accommodate relatively high misalignment between the coupled driving and driven shafts without excessive wear thereof as would otherwise occur.

3. A coupling arrangement for coupling metallic driving and driven shafts, characterized by:

at least one of the driving and driven shafts having an end with a longitudinally extending, substantially circular female profile;

a non-metallic relatively compliant adapter having a longitudinally, substantially circular male profile;

means arranged with the female profile of the end of one of the shafts and with the male profile of the adapter, for non-rotatably securing the adapter to the shaft end;

the adapter and the end of the other of the driving and driven shafts having longitudinally extending, harmonically varying female polygonal profiles;

a metallic coupling shaft, the ends of which each have longitudinally extending, harmonically varying male polygonal profiles corresponding to the female profiles of the adapter and the end of the other of the driving and driven shafts;

the male profiles of the coupling shaft being longitudinally crowned; and the crowned male profiles of the coupling shaft being received in sliding fit relationship by the corresponding female profiles of the adapter and the other of the driving and driven shafts, whereby the mating male and female profiles act in a hinge-like manner to accommodate misalignment between the driving and driven shafts.

4. A coupling arrangement as described by claim 3, further characterized by:

a non-metallic relatively compliant bushing having a longitudinally extending, harmonically varying male polygonal profile and a longitudinally extending, harmonically varying female polygonal profile corresponding respectively to the female profile of the other of the driving and driven shafts and to the male profile of at least one of the ends of the coupling shaft;

the male profile of the bushing being received in press fit relationship by the female profile of the other of the driving and driven shafts, and the female profile of the bushing receiving in sliding fit relationship the male profile of the one end of the coupling shaft; and the relative compliance of the non-metallic bushing being effective in cooperation with the relative compliance of the adapter for accommodating relatively high misalignments between the coupled driving and driven shafts without excessive wear thereof as would otherwise occur.

5. A coupling arrangement for coupling metallic driving and driven shafts, characterized by:

the driving and driven shafts each having ends with longitudinally extending, harmonically varying female profiles;

a metallic coupling shaft, the ends of which each have longitudinally extending, harmonically varying male polygonal profiles corresponding to the female profiles of the ends of the driving and driven shafts;

the male profiles being crowned along their lengths;

at least one non-metallic relatively compliant member having a longitudinally extending, harmonically varying male polygonal profile and a longitudinally extending, harmonically varying female polygonal profile corresponding respectively to the female profile of at least one of the driving and driven shafts and to the male profile of at least one of the ends of the coupling shaft;

the male profile of the member being received in non-rotating relationship by the female profile of the one of the driving and driven shafts;

the crowned male profiles of the coupling shaft being received in sliding fit relationship by the corresponding female profiles of the driving and driven shafts and the compliant member, whereby the mating male and female profiles act in a hinge-like manner to accomodate misalignment between the coupled driving and driven shafts; and the relative compliance of the compliant member being effective to accomodate relatively high misalignment between the coupled driving and driven shafts without excessive wear thereof as would otherwise occur.

6. A coupling arrangement for coupling metallic driving and driven shafts as described by claim 5, characterized by:

the non-metallic relatively compliant member being a bushing; and the male profile of said bushing being received in press fit relationship by the female profile of the one of the driving and driven shafts so as to be in non-rotating relationship relative thereto, and the female profile of said bushing receiving in sliding fit relationship the male profile of the one end of the coupling shaft.

7. A coupling arrangement for coupling metallic driving and driven shafts as described by claim 5, characterized by:

the non-metallic relatively compliant member being an adapter; and spline means arranged with the female profile of the one of the driving and driven shafts and with the male profile of the adapter for securing the adapter in non-rotating relationship to said shaft, and the female profile of said member receiving in sliding fit relationship the male profile of the one end of the coupling shaft.

* * * * *